United States Patent
Tobin et al.

(10) Patent No.: US 9,869,297 B2
(45) Date of Patent: *Jan. 16, 2018

(54) ATTACHMENT METHOD AND SYSTEM TO INSTALL COMPONENTS, SUCH AS VORTEX GENERATORS, TO A WIND TURBINE BLADE

(71) Applicant: General Electric Company, Schenectady, NY (US)

(72) Inventors: James Robert Tobin, Simpsonville, SC (US); William Max Gobeli, Simpsonville, SC (US); Scott Gabell Riddell, Greer, SC (US); Michael Christopher Booth, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 357 days.

This patent is subject to a terminal disclaimer.

(21) Appl. No.: 14/706,026

(22) Filed: May 7, 2015

(65) Prior Publication Data

US 2016/0327021 A1    Nov. 10, 2016

(51) Int. Cl.
*A46D 1/00* (2006.01)
*B44C 1/17* (2006.01)
(Continued)

(52) U.S. Cl.
CPC ............ *F03D 1/0675* (2013.01); *F03D 13/10* (2016.05); *B29C 65/483* (2013.01);
(Continued)

(58) Field of Classification Search
CPC ... Y02E 10/721; F03D 1/0675; F03D 1/0633; F05B 2260/96; F05B 2240/30;
(Continued)

(56) References Cited

U.S. PATENT DOCUMENTS

RE19,412 E    1/1935  Zaparka
2,450,440 A   10/1948 Mills
(Continued)

FOREIGN PATENT DOCUMENTS

EP   2 653 717 A1   10/2013
EP   3 037 655 A1   6/2016
(Continued)

OTHER PUBLICATIONS

Co-Pending U.S. Appl. No. 13/609,719, filed Sep. 11, 2012.

*Primary Examiner* — Philip Tucker
*Assistant Examiner* — Brian R Slawski
(74) *Attorney, Agent, or Firm* — Dority & Manning, P.A.

(57) ABSTRACT

A method for installing an add-on component to a surface of a wind turbine blade includes attaching an adhesive side of strips of a double-sided adhesive tape onto either the surface of the wind turbine blade or a surface of the add-on component, the tape strips having a release liner on an opposite exposed side thereof. The tape strips having an extension tail of the release liner that extends beyond an edge of the add-on component when the add-on component is placed and held at a desired position against the surface of the wind turbine blade. With the add-on component held at the desired position, the extension tail is pulled away at an angle such that that release liner is removed along the length of the tape strip while maintaining the add-on component against the blade surface to attach the exposed adhesive under the release liner to either the surface of the wind turbine blade or the surface of the add-on component.

9 Claims, 5 Drawing Sheets

(51) Int. Cl.

| | |
|---|---|
| *B63H 1/26* | (2006.01) |
| *F03D 11/02* | (2006.01) |
| *B64C 11/16* | (2006.01) |
| *B64C 11/24* | (2006.01) |
| *D05C 15/00* | (2006.01) |
| *B32B 15/04* | (2006.01) |
| *B64C 27/46* | (2006.01) |
| *F04D 29/38* | (2006.01) |
| *B32B 3/06* | (2006.01) |
| *F03B 3/12* | (2006.01) |
| *B32B 33/00* | (2006.01) |
| *B32B 37/00* | (2006.01) |
| *B32B 38/10* | (2006.01) |
| *B32B 5/00* | (2006.01) |
| *F01D 5/14* | (2006.01) |
| *F01D 5/18* | (2006.01) |
| *B29C 51/16* | (2006.01) |
| *B29C 63/00* | (2006.01) |
| *B29C 65/00* | (2006.01) |
| *F03B 7/00* | (2006.01) |
| *B63H 7/02* | (2006.01) |
| *B32B 7/04* | (2006.01) |
| *B32B 7/12* | (2006.01) |
| *B32B 7/14* | (2006.01) |
| *B32B 9/00* | (2006.01) |
| *F03D 1/06* | (2006.01) |
| *F03D 13/10* | (2016.01) |
| *B29C 65/48* | (2006.01) |
| *B29C 65/72* | (2006.01) |
| *B29C 65/50* | (2006.01) |
| *B29C 65/56* | (2006.01) |

(52) U.S. Cl.
CPC ...... *B29C 65/4825* (2013.01); *B29C 65/5057* (2013.01); *B29C 65/562* (2013.01); *B29C 65/72* (2013.01); *F05B 2240/122* (2013.01); *Y02E 10/721* (2013.01)

(58) Field of Classification Search
CPC ............ F05B 2240/32; F05B 2240/122; F05B 2230/80; F05B 2230/60; F05B 2250/18; F05B 2250/183; Y02P 70/523; B29C 65/4825; B29C 65/483; B29C 65/50; B29C 65/5057; B29C 65/5021; B29C 65/56; B29C 65/562; B29C 65/72
USPC ..... 156/60, 72, 91, 196, 212, 229, 230, 233, 156/235, 241, 247, 289, 290, 291, 718, 156/719; 428/40.1, 343, 352, 354, 100, 428/41.8; 416/223 R, 224, 228, 229 R, 416/241 R, 235, 236 R, 236 A
See application file for complete search history.

(56) References Cited

U.S. PATENT DOCUMENTS

| | | |
|---|---|---|
| 3,137,887 A | 6/1964 | Manning et al. |
| 3,528,753 A | 9/1970 | Dutton et al. |
| 3,586,460 A | 6/1971 | Toner |
| 4,329,119 A | 5/1982 | Baskin |
| 4,626,172 A | 12/1986 | Mouille et al. |
| 5,088,665 A | 2/1992 | Vijgen et al. |
| 5,346,367 A | 9/1994 | Doolin et al. |
| 6,890,152 B1 | 5/2005 | Thisted |
| 7,059,833 B2 | 6/2006 | Stiesdal et al. |
| 7,458,777 B2 | 12/2008 | Herr |
| 7,637,721 B2 | 12/2009 | Driver et al. |
| 7,988,421 B2 | 8/2011 | Bakhuis et al. |
| 8,083,488 B2 | 12/2011 | Fritz |
| 8,162,590 B2 | 4/2012 | Haag |
| 8,376,450 B1 | 2/2013 | Long et al. |
| 8,678,746 B2 | 3/2014 | Haag |
| 2007/0065290 A1 | 3/2007 | Herr |
| 2007/0077150 A1 | 4/2007 | Llorente Gonzalez |
| 2009/0074585 A1 | 3/2009 | Koegler et al. |
| 2010/0135806 A1 | 6/2010 | Benito |
| 2010/0296940 A1 | 11/2010 | Zuteck |
| 2010/0296941 A1 | 11/2010 | Zuteck |
| 2011/0018282 A1 | 1/2011 | Hayashi et al. |
| 2011/0076149 A1 | 3/2011 | Santiago et al. |
| 2011/0097326 A1 | 4/2011 | Luehrsen |
| 2011/0135467 A1 | 6/2011 | Saddoughi et al. |
| 2011/0142635 A1 | 6/2011 | Frizt |
| 2011/0142667 A1 | 6/2011 | Miebach et al. |
| 2011/0142668 A1 | 6/2011 | Rao |
| 2011/0223028 A1 | 9/2011 | Stege et al. |
| 2011/0243736 A1 | 10/2011 | Bell |
| 2011/0268558 A1 | 11/2011 | Driver |
| 2012/0027590 A1 | 2/2012 | Bonnet |
| 2012/0121430 A1 | 5/2012 | Olsen et al. |
| 2012/0257979 A1* | 10/2012 | Jensen .................. F03D 1/0608 416/223 R |
| 2012/0282105 A1* | 11/2012 | Grife .................... F03D 1/0675 416/228 |
| 2013/0129519 A1* | 5/2013 | Nielsen ................. F03D 1/0633 416/228 |
| 2014/0186175 A1 | 7/2014 | Baehmann et al. |
| 2014/0328692 A1 | 11/2014 | Riddell et al. |
| 2016/0327019 A1* | 11/2016 | Tobin ................... F03D 1/0675 |
| 2016/0327020 A1* | 11/2016 | Tobin ................... F03D 1/0633 |

FOREIGN PATENT DOCUMENTS

| | | |
|---|---|---|
| WO | WO 2012/076168 A2 | 6/2012 |
| WO | WO 2013/023745 A1 | 2/2013 |
| WO | WO 2013/178624 A2 | 12/2013 |

\* cited by examiner

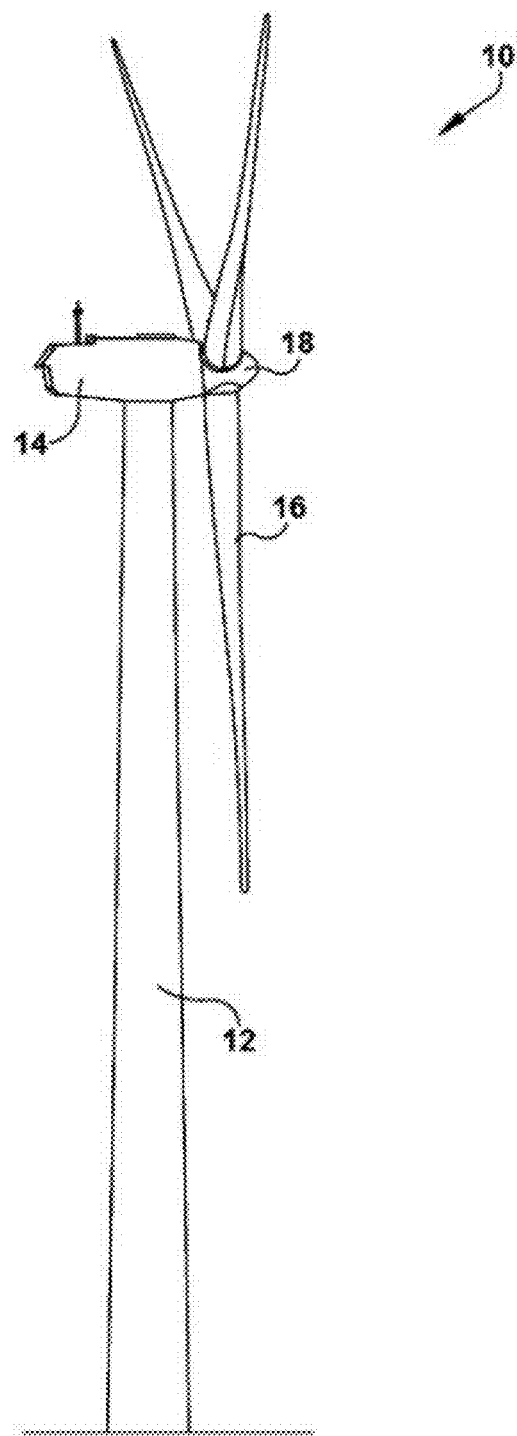
FIG. -1-

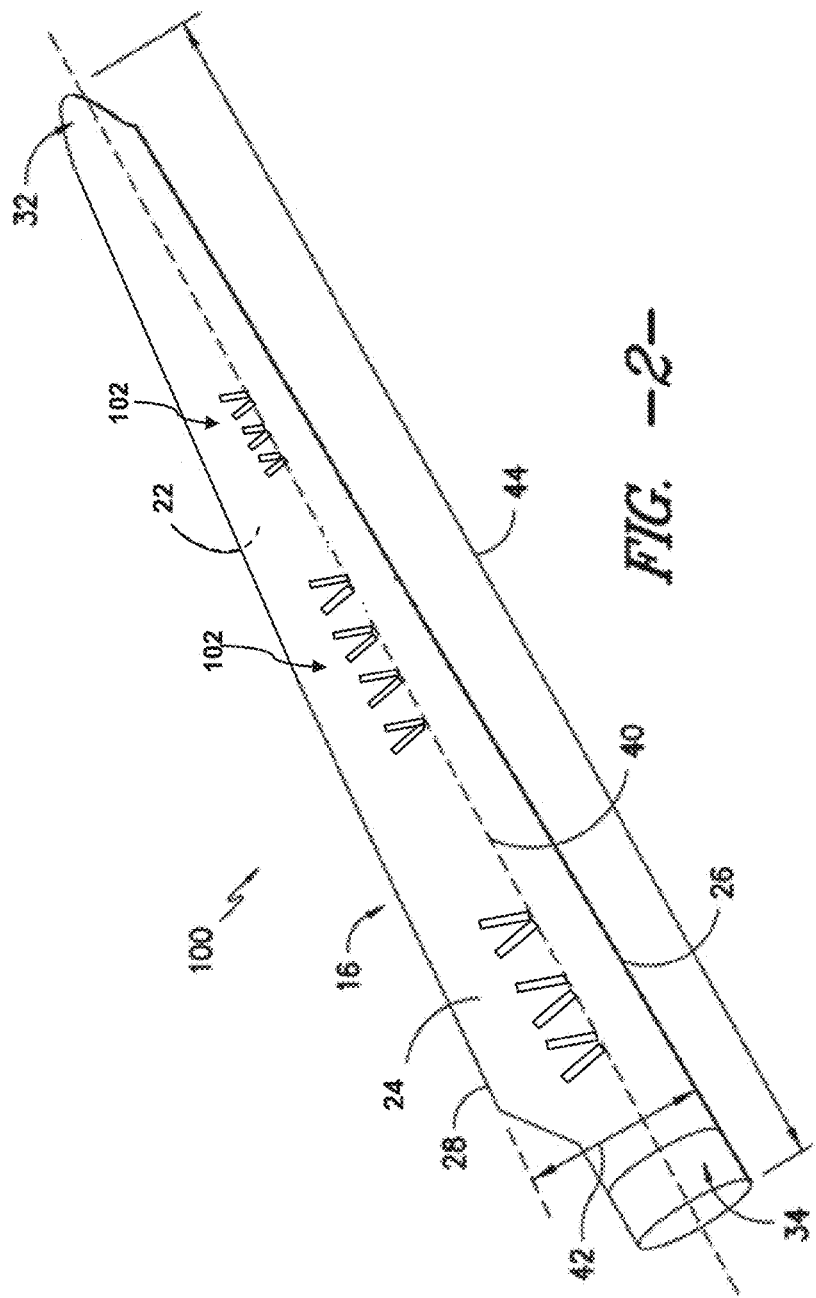

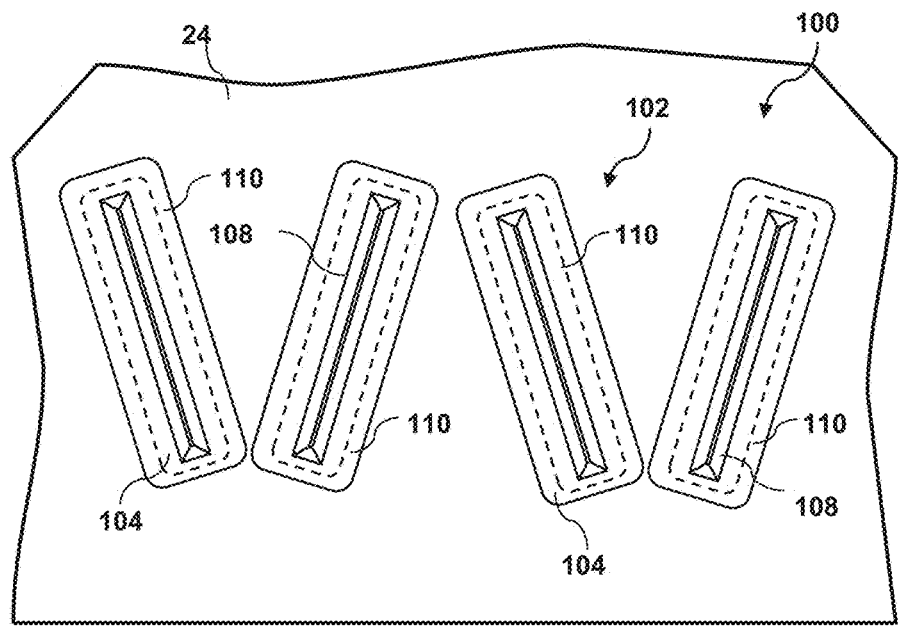
FIG. -3-
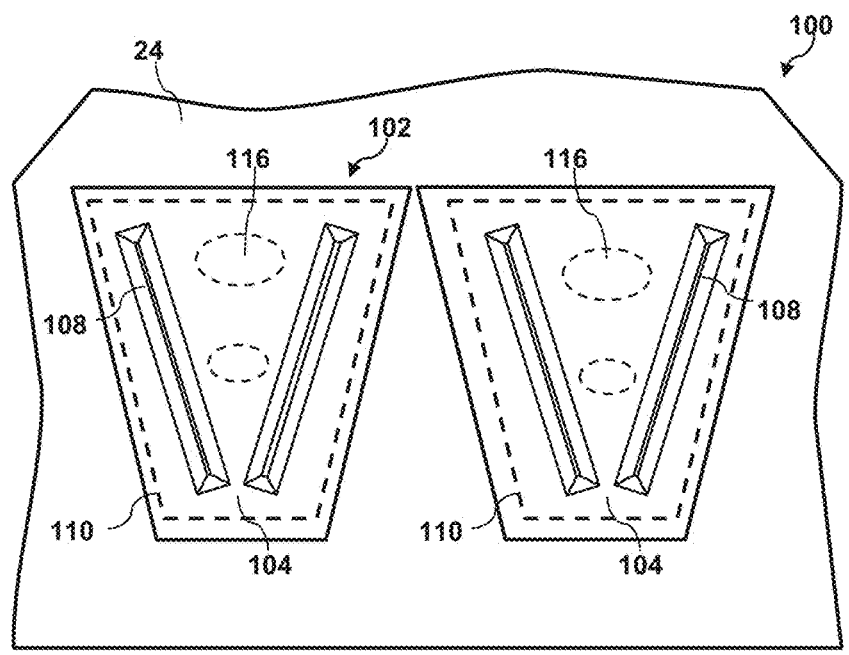
FIG. -4-

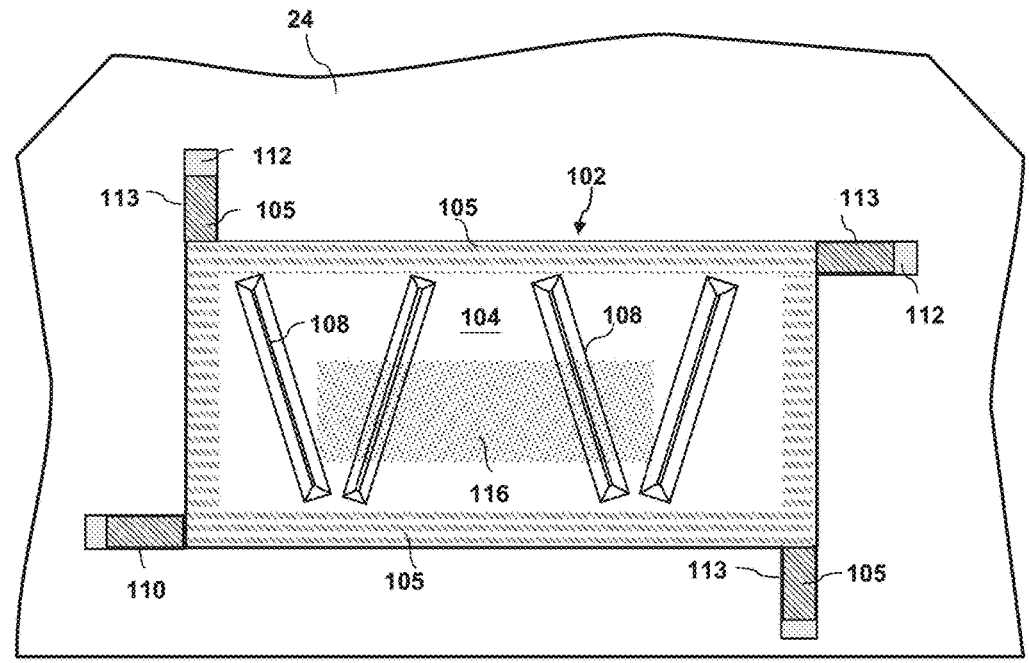
FIG. -5-
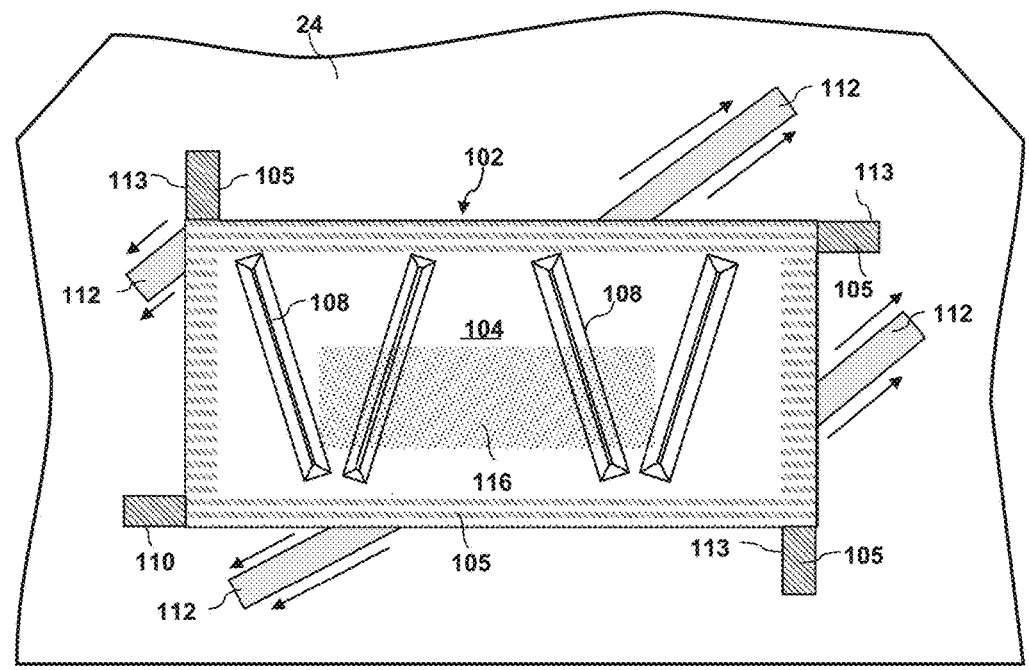
FIG. -6-

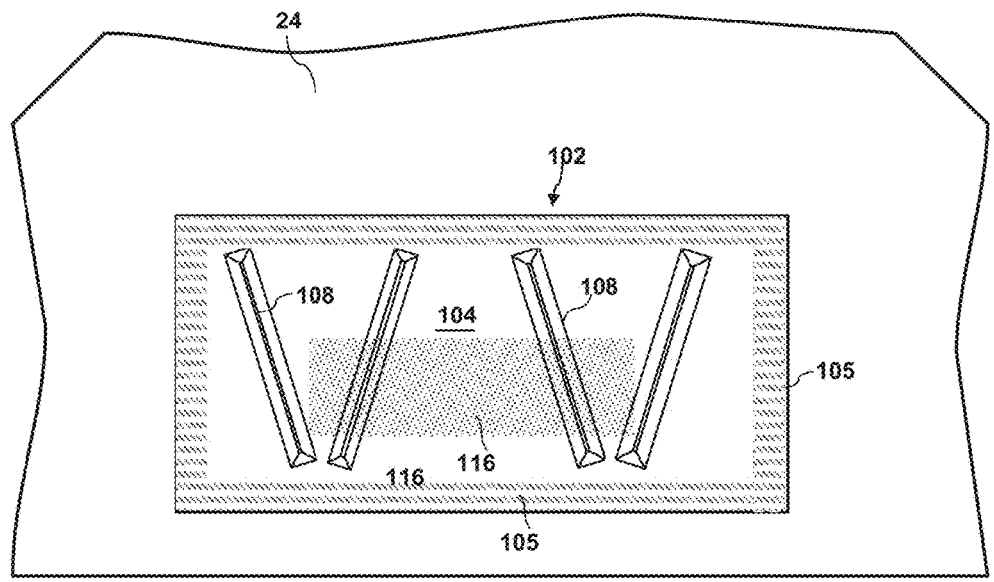
*FIG. -7-*
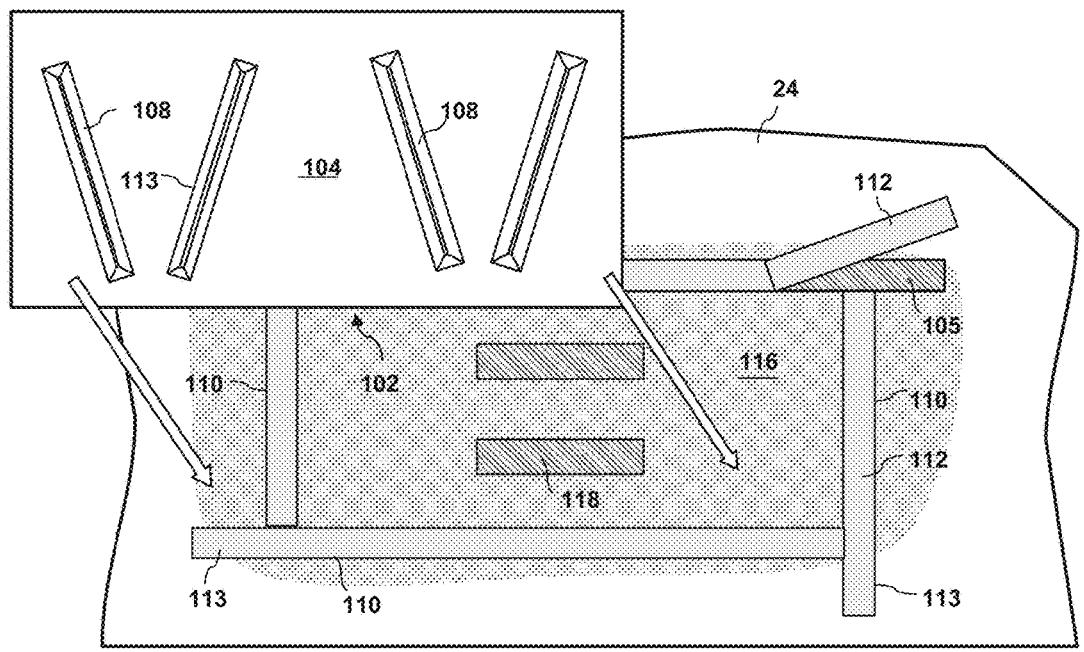
*FIG. -8-*

ATTACHMENT METHOD AND SYSTEM TO INSTALL COMPONENTS, SUCH AS VORTEX GENERATORS, TO A WIND TURBINE BLADE

FIELD OF THE INVENTION

The present disclosure relates in general to wind turbine rotor blades, and more particularly to a system and method for attaching components, such as tip extensions, winglets, and vortex generators to the wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade in order to increase the energy conversion efficiency during normal operation of the wind turbine by increasing the lift force of the blades while decreasing the drag force. Such components include, for example, winglets, tip extensions, and vortex generators. The purposes and operational principals of these devices are well understood by those skilled in the art.

The installation techniques and systems for attaching conventional add-on components can be expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personal) must be taken. In addition, the smearing of liquid or past adhesives while pushing the add-on components into place can result in inconsistent and unpredictable results, particularly for tip extension add-ons that are pushed onto the tip end of an existing blade in the field.

The industry has recognized that double-sided strain isolation tapes offer substantial benefits for attaching add-on components, but the use of such tapes has proven to be challenging to precisely install the components (especially larger components) due to the instant bond once the tape makes contact with a mating surface. Repositioning of the part can be difficult, if not impossible.

U.S. Pat. Pub. No. 2014/0328692 describes a vortex generator accessory that is mounted to either of the suction side or pressure side of a wind turbine blade and includes a base portion and a protrusion member extending upwardly from the base portion. An attachment layer connects the base portion to the suction or pressure side. The attachment layer has a lower shear modulus than the base portion to allow for shear slippage between the base portion and the underlying suction or pressure side. The attachment layer may be a foam-based strip member with adhesive on opposite interface sides thereof. For example, this attachment layer may be Very High Bond (VHB™) or SAFT (Solar Acrylic Foam Tape) foam-based strip material.

Thus, the industry is continuously seeking improved methods for installing add-on components to wind turbine blades in a fast and low-cost operation that also provides for a repositioning opportunity to ensure accurate add-on component placement.

BRIEF DESCRIPTION OF THE INVENTION

Aspects and advantages of the invention will be set forth in part in the following description, or may be obvious from the description, or may be learned through practice of the invention.

In accordance with aspects of the invention, a method for installing an add-on component to a surface of a wind turbine blade is provided. The method includes attaching an adhesive side of one or more strips of a double-sided adhesive tape (referred to collectively herein as "tape strips") onto either surface of the wind turbine blade (pressure side or suction side surface) or a surface of the add-on component, with the tape strips having a release liner on their opposite exposed side.

Each of the tape strips has an extension tail of the release liner that extends beyond an edge of the add-on component when the add-on component is placed and held at a desired position against the surface of the wind turbine blade. This extension tail may be an extension of the release liner itself, or another component (e.g., wire or string) attached to the release liner. With the add-on component held at the desired position on the blade, the extension tail is pulled away from the add-on component at an angle such that that release liner is removed along the length of the tape strip while the add-on component is maintained at the desired position on the surface of the wind turbine blade, In this manner, the adhesive layer from under the release liner is exposed without the add-on component moving relative to the surface of the wind turbine, and the add-on component is securely attached to the blade surface. The extension tails may then be trimmed or removed from the tape strips.

In one embodiment of the tape strip configuration, an exposed adhesive side of the tape strips is initially attached to the add-on component by pressing the tape strips onto the add-on component at a desired location. The add-on component is then positioned on the blade surface and the extension tail is pulled away from the add-on component, wherein the newly exposed adhesive from under the release liner attaches to the surface of the wind turbine blade. In this embodiment, the tape strips may be attached around an interior surface perimeter of the add-on component.

In an alternate embodiment of the tape strip configuration, the tape strips are initially attached to the surface of the wind turbine blade by pressing the tape strips onto the surface of the wind turbine blade at a desired location. The add-on component is then positioned on the tape strips and the extension tail is pulled away from the blade surface so that the newly exposed adhesive from under the release liner attaches to the surface of the add-on component.

In certain embodiments, an additional attaching mechanism is provided between the add-on component and the surface of the wind turbine blade in areas between or adjacent the tape strips. For example, the additional attaching mechanism may be an adhesive paste or liquid, or mechanical fastener such as a hook-and loop material, applied within a central region of the add-on component (e.g., within the perimeter of the tape strips). In an alternate embodiment, the additional attachment mechanism may be one or more pieces of the double-sided adhesive tape located between or adjacent the tape strips with the release liner removed from both sides to achieve an initial placement bonding between the add-on component and the surface of the wind turbine blade upon placement of the add-on component at the desired position on the blade surface for permanent attachment.

It should be appreciated that the present methodology is not limited to attachment of any particular type of add-on component. For example, the add-on component may be any one or combination of a vortex generator, tip extension, winglet, leading edge extension, trailing edge extension or serration, blade fence, spoiler, blade skin, or instrumentation.

The present invention encompasses any manner of wind turbine blade having an add-on component attached in accordance with the methods described herein.

It should be appreciated that the methods described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of an embodiment of a rotor blade assembly with add-on components in accordance with the present disclosure;

FIG. 3 is a partial top view of another embodiment of a rotor blade with an add-on component;

FIG. 4 is a partial top view of still another embodiment of a rotor blade with an add-on component;

FIG. 5 is a partial top view of a different embodiment of a rotor blade assembly with an add-on component being installed thereon;

FIG. 6 is a partial top view of the embodiment of FIG. 5 at a subsequent assembly step;

FIG. 7 is a partial top view of the embodiment of FIG. 6 after final assembly on the rotor blade; and FIG. 8 is a partial top view of a rotor blade assembly with a different add-on component being installed thereon.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade assembly 100 is illustrated with a plurality of add-on components 102 attached to a surface 24 (e.g., suction side surface) of the blade 16 in accordance with aspects of the present invention. The rotor blade 16 has a pressure side 22 and a suction side 24 extending between a leading edge 26 and a trailing edge 28, and extends from a blade tip 32 to a blade root 34. The rotor blade 16 further defines a pitch axis 40 relative to the rotor hub 18 (FIG. 1) that typically extends perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

The rotor blade 16 defines a chord 42 and a span-wide direction 44. As shown in FIG. 2, the chord 42 may vary throughout the span 44 of the rotor blade 16. Thus, a local chord may be defined for the rotor blade 16 at any point on the rotor blade 16 along the span 44.

It should be appreciated that the present method for attaching an add-on component 102 is relevant to attaching any component to any outside surface of the blade 16. In the embodiment of FIG. 2, the add-on components 102 are depicted as a plurality of vortex generators for illustrative purposes attached on the suction side surface 24 along the span aspect of the blade 16. The vortex generators are configured in pairs to define generally V-shaped formations oriented towards the leading edge 28. It should be appreciated that the vortex generators could also be attached on the pressure side surface 22 with the methods described herein.

The add-on components 102 (e.g., vortex generators) depicted in FIGS. 3 and 4 includes a base portion 104 and a protrusion member 108 extending upwardly from the base portion 104, which may be any suitable flow disrupting configuration, such as a fin, or like structure. The base portion 104 may be defined as a generally continuous plate-like structure that presents a generally flat, planar surface that contours and adheres to the mating blade surface. Functional components, such as the protrusion member 108, may be formed integral with the base portion 104, or separately attached to the base portion 104.

In general, an add-on component 102 may be placed at any location on either or both of the blade's flow surfaces 22, 24 wherein it is desired to modify the aerodynamic characteristics of the surface. In this regard, the add-on components 102 may be any one or combination of vortex generator, tip extension, winglet, leading edge extension, trailing edge extension, and so forth. The invention is not limited to any particular type of add-on component and the embodiments depicted in the figures and described herein are for illustrative purposes only.

Referring to FIGS. 3 and 4, adhesive strips of a double-sided adhesive tape 110 are adhered in any desired pattern or configuration onto the underside of the add-on component 102 (in particular, the base 104) and the blade surface 24. The pattern may be, for example, around the perimeter of the base portion 104. The tape 110 may be initially adhered to the underside of the add-on component 102, which is then pressed against the blade surface for subsequent removal of the release liner from the opposite side of the tape 110 (as explained more fully below). Alternately, the tape 110 may be initially adhered to the blade surface 24, wherein the add-on component 102 is subsequently pressed against the tape for subsequent removal of the release liner from between the underside of the add-on component and the tape 110.

FIG. 4 depicts the add-on components 102 adhered to the blade surface 24 with the double-sided adhesive tape 110 around the perimeter of the base portion 104, as well as an additional attachment mechanism 116 in the form of a liquid or paste adhesive between the base portion 104 and the blade surface 24. This adhesive 116 may serve to attach portions of the base 104 that cannot be adhered with tape because of its interior location, or to accommodate mismatches resulting from manufacturing tolerances between the blade and the add-on component. Upon curing, the adhesive adds to the secure attachment of the add-on component 102 to the blade surface 24.

FIG. 5 depicts an embodiment wherein the add-on component 102 includes a rectangular base portion 104. Tape strips 110 are initially attached around the perimeter of the base portion 104 by peeling off the release liner from one side of the tape and pressing the exposed adhesive 105 onto the underside of the base portion 104 around the perimeter thereof. The adhesive 105 is depicted around the perimeter on the underside of the base portion 104 by the dashed pattern in FIG. 5.

Each of the tape strips 110 has a length so as to define an extension tail 113 that extends beyond the perimeter or border of the base portion 104. In the illustrated embodiments, these extension tails 113 are defined by extensions of the release liner 112 (on the opposite side of the exposed adhesive), as particularly illustrated in FIG. 5. In alternate embodiments, the extension tail may include any material or component that is attached to the release liner 112 between the add-on component 102 and the blade surface 24, such as a string, wire, ribbon, and so forth.

Referring to FIG. 6, the add-on component 102 is held or otherwise maintained at a desired location on the blade surface (e.g., by being pressed against the blade surface 24). It should be appreciated that there may be some degree of inherent "play" or movement of the add-on component 102 at the desired position on the blade as the release liners 112 are removed.

While maintaining the location of the add-on component 102 (in particular to the base portion 104), the extension tail 113 (and thus release liner 112) is grasped and pulled away from the base portion 104 as indicated by the arrows in FIG. 6. This pulling action causes the release liner 112 to pull away from the opposite side of the tape 110 thereby exposing the adhesive 105 on such opposite side. The release liner 112 is removed along the length of the tape strips 110 while the add-on component 102 is maintained in position relative to the blade surface 24. In this manner, the adhesive layer 105 under the release liner is exposed without the add-on component 102 moving relative to the surface 24 of the wind turbine blade. The add-on component 112 is pressed against the surface 24 and is thus securely attached to the blade surface 24.

It should be appreciated that in the embodiment of FIG. 6, upon removal of all of the release liners 112, the exposed adhesive portion 105 of each of the extension tails 113 may remain. In FIG. 7, a final step may include trimming the remaining adhesive tails 105 depicted in FIG. 6 to achieve the finished assembly depicted in FIG. 7.

FIG. 7 also depicts the underlying adhesive 105 in the dashed pattern around the perimeter of the base portion 104 that securely attaches the add-on component 102 to the blade surface 24.

As discussed above with the embodiment of FIG. 4, an additional attachment mechanism may be provided between the underside of the add-on component 102 and the blade surface 24. In the illustrated embodiment, this additional attachment mechanism is, again, a bond paste or liquid 116 that is applied between the components 102, 24 before securing the components with the tape strips 110 as discussed above.

FIG. 8 depicts an alternate embodiment wherein the tape strips are initially attached onto the surface 24 of the blade in a configuration that corresponds to the perimeter of the add-on component 102 that will be subsequently attached to the blade surface 24.

FIG. 8 depicts one of the release liners 112 being removed via its extension tail 113. After all of the release liners 112 have been removed, the add-on component 102 is carefully positioned and then pressed against the exposed adhesive 105 of the tape strips 110. After this step wherein the base portion 104 is securely attached to the blade surface 24, the exposed adhesive portions of the extension tails 113 can be trimmed to provide the finished product configuration depicted in FIG. 7.

FIG. 8 also depicts an additional aspect that may be incorporated into any of the other embodiments described herein. In particular, an adhesive 116 is depicted as underlying the adhesive tape strips 110. In certain embodiments, it may be desired to coat the surface of the blade where the add-on component will be placed with a liquid or paste adhesive (e.g., and epoxy) 116, for example to compensate for any surface irregularities or mismatch between the blade surface and the add-on component 102 due to machining tolerances, before positioning the tape strips 110 on the blade surface 24. The tape strips 110 and add-on component can then be attached before the adhesive 116 cures, which provides a degree of positioning adjust of the add-on component 102 due to the fact that the adhesive 116 is still in liquid or paste form. Alternatively, the adhesive 116 (with tape strips attached thereto) may be allowed to cure before placement of the add-on component. In either case, this particular embodiment also gives the advantage of a strong bond provided by the adhesive 116 in combination with the shear stress reduction provided by the tape strips 110.

In FIG. 8, the additional attachment mechanism that may be provided between the add-on component 102 and the blade surface 24 is in the form of additional double-sided tape strips 118 positioned within the interior of the bordering tape strips 110. These tape strips 118 serve the same purpose as the adhesive 116 discussed above with respect to the embodiments of FIGS. 4 through 7.

It should be appreciated that the methods described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing an add-on component to a surface of a wind turbine blade, the method comprising:
   attaching an adhesive side of one or more strips of a double-sided adhesive tape onto either the surface of the wind turbine blade or a surface of the add-on component, the tape strips having a release liner on an opposite exposed side thereof;
   each of the tape strips having an extension tail from the release liner that extends beyond an edge of the add-on component when the add-on component is placed and held at a desired position against the surface of the wind turbine blade; and
   with the add-on component held at a desired location, pulling the extension tail away from the add-on component at an angle such that that release liner is removed along the length of the tape strip while maintaining the desired location of the add-on component against the surface of the wind turbine blade to attach the exposed adhesive under the release liner to the surface of the wind turbine blade or the surface of the add-on component.

2. The method as in claim 1, wherein the tape strips are initially attached to the add-on component, and wherein as the release liner is removed from the tape strips on the add-on component, the exposed adhesive attaches to the surface of the wind turbine blade.

3. The method as in claim 2, wherein the tape strips are attached around a perimeter of an interior inside mounting surface of the add-on component.

4. The method as in claim 1, wherein the tape strips are initially attached to the surface of the wind turbine blade, and wherein as the release liner is removed from the tape strips, the exposed adhesive attaches to the surface of the add-on component.

5. The method as in claim 4, further comprising applying a layer of adhesive paste or liquid between the tape strips and the surface of the wind turbine blade and allowing the layer of adhesive to cure before attaching the add-on component to the tape strips.

6. The method as in claim 1, further comprising applying an additional attaching mechanism between the add-on component and the surface of the wind turbine blade in areas between the tape strips.

7. The method as in claim 6, wherein the additional mechanism is an adhesive paste or liquid, or hook-and-loop fastener.

8. The method as in claim 6, wherein the additional mechanism is one or more pieces of the double-sided adhesive tape located between the tape strips with the release liner removed from both sides to achieve a placement bonding between the add-on component and the surface of the wind turbine blade upon initial placement of the add-on component at the desired position.

9. The method as in claim 1, wherein the add-on component is one of a vortex generator, tip extension, winglet, leading edge extension, trailing edge extension or serration, blade fence, spoiler, blade skin, or instrumentation.

* * * * *